United States Patent [19]
Kawaharazuka et al.

[11] Patent Number: 4,595,142
[45] Date of Patent: Jun. 17, 1986

[54] BLOWER/SPRAY DEVICE

[75] Inventors: Yukio Kawaharazuka, Ageo; Giichi Iida, Tokyo, both of Japan

[73] Assignee: Kioritz Corporation, Tokyo, Japan

[21] Appl. No.: 667,426

[22] Filed: Nov. 1, 1984

[30] Foreign Application Priority Data

Nov. 11, 1983 [JP] Japan .............................. 58-174620[U]

[51] Int. Cl.⁴ ........................ B05B 9/04; A47G 19/14
[52] U.S. Cl. .................................. 239/373; 222/465 R
[58] Field of Search ...................... 222/465 R; 239/373

[56] References Cited

U.S. PATENT DOCUMENTS 2,958,155  11/1960  Emmerich ..................... 239/373 X
3,586,238  6/1971  Schmierer et al. .
4,512,515  4/1985  Tenney ........................... 239/373 X

FOREIGN PATENT DOCUMENTS 1048066  4/1963  Fed. Rep. of Germany .

Primary Examiner—Andres Kashnikow
Assistant Examiner—Patrick N. Burkhart
Attorney, Agent, or Firm—Sheridan Neimark; Karl W. Flocks

[57] ABSTRACT

A blower/spray device includes a liquid tank removably mounted on a main body, and a seal located between an outlet end of an air extracting line and an outer end of a tubular air introducing member for connecting and disconnecting an air extracting device.

3 Claims, 3 Drawing Figures

BLOWER/SPRAY DEVICE

BACKGROUND OF THE INVENTION

1. Field of the Invention

This invention relates to a blower/spray device of the type which comprises a main body having a blower mounted therein, a tank located above the main body for storing a liquid chemical agent to be sprayed in atomized particles, and air extracting means for extracting air from the blower and introducing same into an open space in an upper portion of the tank to pressurize the liquid chemical agent stored in the tank.

2. Description of the Prior Art

Generally, a blower/spray device of the type described is fitted with an internal combustion engine located in the main body for driving the blower and is usually constructed such that it is carried on the back of an operator when the device is put to use. To this end, it is essential that this type of blower/spray device be compact in size and light in weight. However, in this type of blower/spray device of the prior art, the tank for storing the liquid chemical agent is immovably connected to the main body, and the air extracting means is undetachably attached both to the main body and to the tank. This arrangement has made it necessary for the operator to carry the blower/spray device having the liquid tank connected to the main body, even when the device is used merely for the purpose of supplying an air current by actuating the blower without spraying the liquid chemical agent. This brings a great burden to bear upon the operator. To obviate this disadvantage, proposals have been made to provide a blower/spray device which is provided with a removable liquid tank mounted thereto. However, even if the tank is removable, it is time-consuming to mount the tank including the air extracting means to the main body and removing same therefrom, resulting in a fall in operation efficiency.

SUMMARY OF THE INVENTION

1. Object of the Invention

This invention has been developed for the purpose of obviating the disadvantages of the prior art described hereinabove. Accordingly, the invention has as its object the provision of a blower/spray device, simple in construction and easy to handle, in which a liquid tank is removably mounted to a main body of the device and air extracting means can be readily connected to and disconnected from the liquid tank.

2. Statement of the Invention

Outstanding characteristics of the invention enabling the aforesaid object to be accomplished include mounting means for removably mounting the liquid tank on an upper surface of the main body, air extracting means comprising an air extracting line secured to the main body having an inlet end located in a high pressure chamber of the blower and an outlet end opening at the upper surface of the main body on which the liquid tank is supported, a tubular air introducing member secured to a bottom wall of the liquid tank in a position in which an outer end of the tubular air introducing member is maintained in alignment and communication with the outlet end of the air extracting line, seal means interposed between the outlet end of the air extracting line and the outer end of the tubular air introducing member, and an air line secured at one end to an inner end of the tubular air introducing member and extending upwardly through the liquid tank to open at an opposite end in an open space formed in an upper portion of the liquid tank, and a grip member mounted to the main body by the mounting means to close the outlet end of the air extracting line after the liquid tank has been removed from the main body while permitting the operator to grasp the blower/spray device for moving same from one place to another.

By virtue of the aforesaid outstanding characteristics of the invention, the liquid tank which is bulky and relatively heavy can be readily removed from the main body and the small grip member which is of light weight can be readily mounted to the main body to close the outlet end of the air extracting line to prevent leaks of air under pressure from the blower when the blower/spray device is used for the purpose of merely supplying an air current without spraying a liquid chemical agent. The liquid tank can be readily removed from the main body and the small grip member which is of can be readily mounted to the main body, so that transportation of the blower/spray device can be facilitated by reducing the overall weight and bulk of the blower/spray device. Thus, the burden hitherto brought to bear upon the operator can be reduced and operation efficiency can be improved.

DETAILED DESCRIPTION OF THE PREFERRED EMBODIMENT

Figure 1:
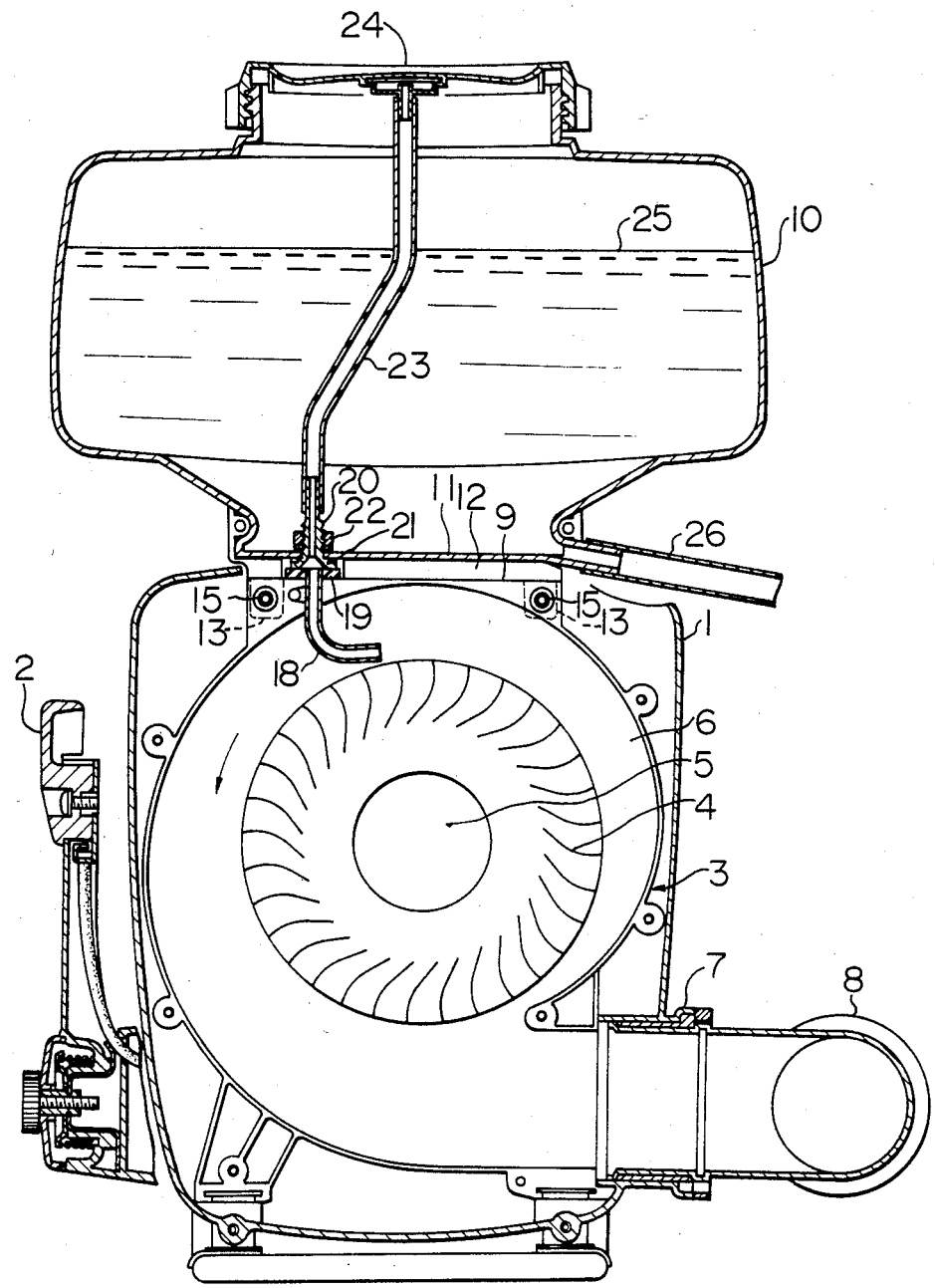
FIG. 1 is a vertical sectional view of the blower/spray device comprising one embodiment of the invention.

The blower/spray device according to the invention will be described by referring to an embodiment shown in the drawings.

Referring to FIG. 1, the blower/spray device shown, which is of the type carried on the back of an operator when put to use, comprises a main body 1 formed in the front thereof (on an end face thereof located beyond the plane of FIG. 1) with means of a known type for carrying the device on the back of an operator. Mounted within the interior of the main body 1 is an internal combustion engine, not shown, of a small size and suitable type serving as a power source which can be controlled by operating a throttle lever 2 connected to one side of the main body 1. A blower 3 is mounted within the main body 1 and includes an impeller 4 connected to the internal combustion engine and driven thereby for rotation to draw air by suction through a central suction port 5 and discharge same into a volute casing 6 after pressurizing same. The volute casing 6 has an outlet end 7 located on a side of the main body 1 opposite the side on which the throttle lever 2 is located and having a curved tube 8 removably connected thereto, so that the pressurized air can be ejected through a forward end of the curved tube 8.

Figure 2:
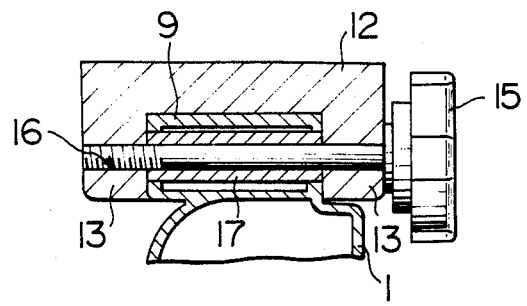
FIG. 2 is a side view, with certain parts being broken away, of the blower/spray device shown in FIG. 1.

The main body 1 has an upper surface 9 on which a liquid tank 10 is removably mounted. The tank 10 has a bottom wall 11 which is planar and has secured to its outer surface a seat-like member 12 which is maintained in close contact with the upper surface 9 of the main body 1. The seat-like member 12 is formed integrally on its undersurface with four downwardly projecting portions 13 of which two are located at opposite sides of a forward end portion of the seat-like member 12 and the other two are located on opposite sides of a rearward end portion thereof, so as to hold an upper portion of the main body 1 between the downwardly projecting portions 13 at the forward and rearward end portions of the seat-like member 12 (see FIG. 2). Two pairs of through holes extending from a forward end of the main body 1 to a rearward end thereof are formed in the downwardly projecting portions 13 of the seat-like member 12 and the upper portion of the main body 1. A pair of manually-openable bolts 15 are each inserted in one of the two pairs of through holes and threadably engage each of internally threaded holes 16 formed in the downwardly projecting portions 13 located in the rearward end portion of the seat-like member 12, to thereby secured the seat-like member 12 and hence the liquid tank 10 to the main body 1. A rubber sleeve 17 is interposed between the downwardly projecting portions 13 at the forward and rearward end portions of the seat-like member 12, and the bolts 15 extend through the rubber sleeve 17 to ensure that the downwardly projecting portions 13 are firmly secured in place.

A curved air extracting line 18 which is secured to the upper portion of the main body 1 has an inlet end opening in a volute casing 6 of the blower 3 in such a manner that its open end faces a upstream end of an air current flowing therethrough and an outlet end terminating at an annular rubber seat 19 secured to the planar upper surface 9 of the main body 1.

A tubular air introducing member 20 is secured to a bottom wall 11 of the liquid tank 10 in a position in which it is maintained in alignment with the outlet end of the air extracting line 18. The tubular air introducing member 20 which extends through the bottom wall 11 of the liquid tank 10 is formed at its outer end with an annular flange 21 which cooperates with a nut 22 mounted on the member 20 inside the tank 10 to clamp against the bottom wall 11 with a seal being interposed therebetween while an end face of the annular flange 21 airtightly presses against the annular rubber seat 19. The air introducing member 20 is airtightly connected at its inner end to one end of a flexible air line 23 of a length having a reserve which extends upwardly through the tank 10 and opens in an open space in an upper portion thereof at an opposite end which is supported by a lid 24 for closing a liquid supplying port of the liquid tank 10. As can be clearly seen in FIG. 1, the seat-like member 12 is formed with a cutout to enable the annular rubber seat 19 and the annular flange 21 of the tubular air introducing member 20 to be suitably connected together in airtight sealing relation.

In the aforesaid construction, when the liquid chemical agent contained in the liquid tank 10 is sprayed, the internal combustion engine is started to drive the blower 3. Air is pressurized in the volute casing 6 and a portion of the pressurized air is led through the air extracting line 18, tubular air introducing member 20 and air line 23 to the open space in the upper portion of the liquid tank 10 without leaking on the way, to pressurize a liquid chemical agent 25 in the liquid tank 20. Thus, the pressurized liquid chemical agent 25 is supplied from the liquid tank 10 to a spray nozzle, not shown, via a liquid feed line 26 connected to a lower portion of the liquid tank 10, so that the liquid chemical agent 25 can be sprayed in atomized particles through the spray nozzle and scattered by the current of air ejected from the blower 3 through the curved tube 8.

Figure 3:
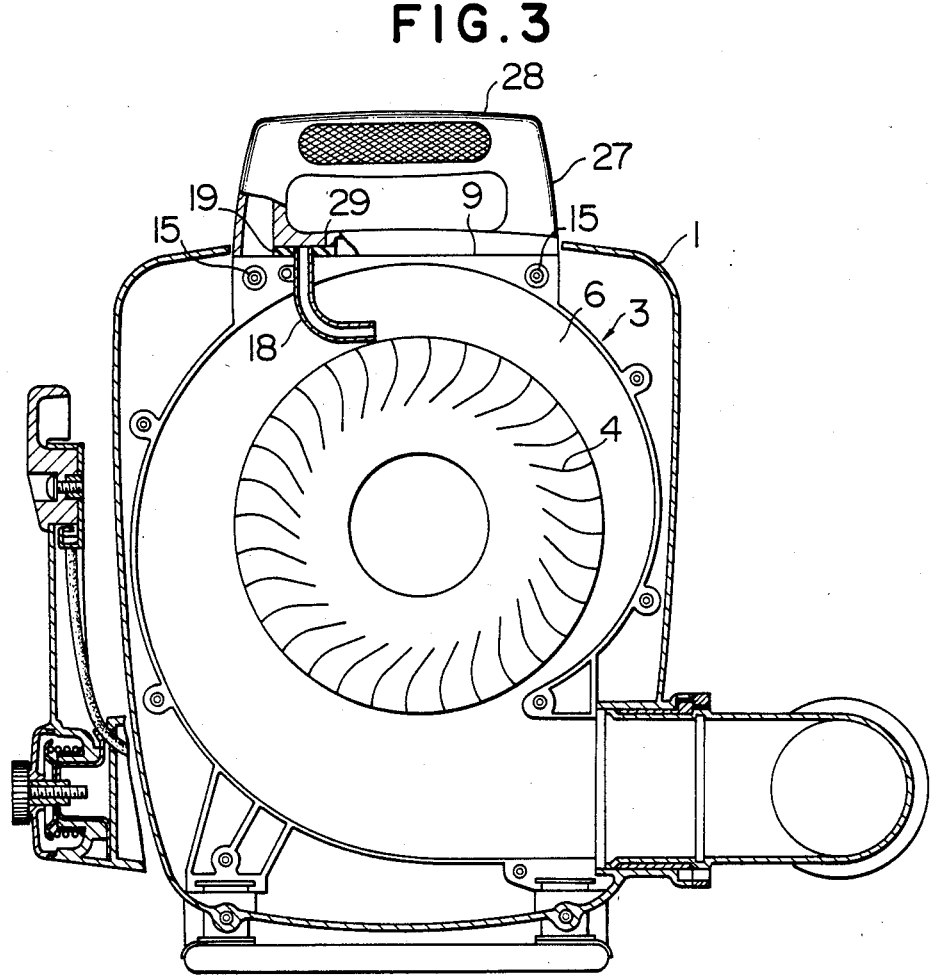
FIG. 3 is a vertical sectional view similar to FIG. 1 but showing another embodiment similar to that of FIG. 1, wherein some of the parts of the blower/spray device of FIG. 1 are replaced by other parts.

When the blower/spray device of the aforesaid construction is used for the purpose of providing an air current only to gather fallen leaves together, for example, the two bolts 15 are withdrawn from the holes formed in the main body 1 and the downwardly projecting portions 13 of the seat-like member 12, and then the liquid tank 10 is removed from the main body 1. Thereafter, a grip member 27 is placed on the upper surface 9 of the main body 1, as shown in FIG. 3, and the two bolts 15 are inserted in the holes and threadably engage the thread holes 16 in the same manner as described previously. Portions of the grip member 27 at which it is secured to the main body 1 by the bolts 15 are similar to the portions of the liquid tank 10 at which it is secured to the main body 1. More specifically, the grip member 27 if formed at its underside with downwardly projecting portions which are formed with holes for the bolts 15 to extend therethrough, to securedly connect the grip member 27 to the main body 1. The grip member 27 includes a handle 28 formed integrally therewith at its upper portion, to enable the operator to grip the handle 28 and move the blower/spray device from one place to another.

The grip member 27 is formed at its underside with a closing surface portion 29 positioned against the annular rubber seat 19 secured to the upper surface 9 of the main body 1 to thereby close the outlet end of the air extracting line 18. Thus, the closing surface portion 29 is positively brought into pressing engagement with the annular rubber seat 19 when the grip member 27 is placed in a predetermined position on the upper surface 9 of the main body 1, so as to thereby prevent the pressurized air in the volute casing 6 of the blower 3 from leaking to outside through the air extracting line 18.

An air cleaner of a large size having a construction similar to that of the grip member 27 may be mounted on the upper surface 9 of the main body 1.

What is claimed is:

1. A blower/spray device comprising:
a mainbody;
a blower located in the main body;
a liquid tank located on an upper surface of said main body for containing a liquid chemical agent to be sprayed in atomized particles; and
air extracting means for extracting air from said blower and feeding same to an open space in an upper portion of said liquid tank to pressurize the liquid chemical agent contained in said liquid tank;
wherein the improvement comprises:
mounting means for removably mounting said liquid tank on the upper surface of the main body; and
a grip member mounted on the upper surface of the main body by said mounting means after the liquid tank has been removed, to enable the operator to grasp the blower/spray device and move same from one place to another; and
wherein the improvement further resides in that said air extracting means comprises:
an air extracting line secured to the main body having an inlet end located in a high pressure chamber of said blower and an outlet end opening at the upper surface of the main body on which the liquid tank is located and closed by said grip member when the liquid tank is removed from the main body and the grip member is mounted on the upper surface of the main body;

a tubular air introducing member secured to a bottom wall of said liquid tank in a position in which an outer end of said tubular air introducing member is maintained in alignment and communication with the outlet end of said air extracting line;

seal means interposed between the outlet end of the air extracting line and the outer end of the tubular air introducing member; and an air line secured at one end thereof to an inner end of the tubular air introducing member and extending upwardly through the liquid tank until it opens at an opposite end in an open space formed in an upper portion of the liquid tank.

2. A blower/spray device as claimed in claim 1, wherein said seal means comprises an annular resilient member located on the upper surface of said main body around the outlet end of said air extracting line, and an annular flange formed at the outer end of said tubular air introducing member and positioned against said annular resilient member, and wherein said grip member has a surface portion brought into abutting engagement with said annular resilient member to close the outlet end of said air extracting line.

3. A blower/spray device as claimed in claim 1, wherein said mounting means comprises projections extending downwardly from a forwad end portion and a rearwad end portion of said liquid tank, a pair of threaded holes formed in the projections extending downwardly from the one end portion of the liquid tank, a pair of through holes formed in the projections extending downwardly from the another end portion of the liquid tank and aligned with said threaded holes, a pair of holes formed in an upper portion of the main body and aligned with said threaded holes and said holes, and a pair of bolts extending through said holes in the projections extending downwardly from the forward end portion of the liquid tank and said holes in the upper portion of the main body and brought into threadable engagement with said threaded holes in the projections extending downwardly from the one end portion of the liquid tank.

* * * * *